US007483450B1

(12) United States Patent
Giese et al.

(10) Patent No.: US 7,483,450 B1
(45) Date of Patent: Jan. 27, 2009

(54) METHOD AND SYSTEM FOR LINK-BASED CLOCK SYNCHRONIZATION IN ASYNCHRONOUS NETWORKS

(75) Inventors: Peter Giese, Kinburn (CA); Wang-Hsin Peng, Ottawa (CA); Donald Ellis, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1134 days.

(21) Appl. No.: 10/323,678

(22) Filed: Dec. 20, 2002

Related U.S. Application Data

(60) Provisional application No. 60/362,809, filed on Mar. 8, 2002.

(51) Int. Cl.
*H04J 3/06* (2006.01)
*H04L 7/00* (2006.01)

(52) U.S. Cl. ........................... 370/507; 370/503
(58) Field of Classification Search ................. 370/507, 370/503, 516, 517, 518; 375/356, 376
See application file for complete search history.

(56) References Cited

U.S. PATENT DOCUMENTS

| 4,736,393 | A | * | 4/1988 | Grimes et al. | 375/356 |
|---|---|---|---|---|---|
| 4,881,223 | A | * | 11/1989 | Debuysscher | 370/398 |
| 5,050,164 | A | * | 9/1991 | Chao et al. | 398/67 |
| 5,353,313 | A | * | 10/1994 | Honea | 375/372 |
| 5,790,543 | A | * | 8/1998 | Cloutier | 370/252 |
| 5,790,607 | A | * | 8/1998 | Burke et al. | 375/355 |
| 5,850,422 | A | * | 12/1998 | Chen | 375/371 |
| 6,072,810 | A | * | 6/2000 | Van der Putten et al. | 370/503 |
| 6,470,032 | B2 | * | 10/2002 | Dudziak et al. | 370/503 |
| 6,714,563 | B1 | * | 3/2004 | Kushi | 370/503 |
| 6,775,300 | B2 | * | 8/2004 | Kuo | 370/503 |
| 6,807,180 | B1 | * | 10/2004 | Restivo | 370/395.62 |
| 7,042,908 | B1 | * | 5/2006 | Mayer | 370/503 |
| 2001/0024457 | A1 | * | 9/2001 | Barry et al. | 370/537 |

FOREIGN PATENT DOCUMENTS

| WO | WO 00/69102 | 11/2000 |
|---|---|---|
| WO | WO 01/18998 | 3/2001 |

OTHER PUBLICATIONS

Jeffery S. Bostak, "Timing Considerations in Modern Optical Telecommunications Systems," Feb. 15, 2001, 21 pages, accessed at <http://www.ewh.ieee.org/r6/scv/ssc_bostak_feb01.pdf>.

* cited by examiner

*Primary Examiner*—Wing F Chan
*Assistant Examiner*—Saba Tsegaye
(74) *Attorney, Agent, or Firm*—Hunton & Williams, LLP

(57) ABSTRACT

A system and method for clock synchronization in a network having one or more asynchronous data links is provided. A clock signal is propagated through, at the physical layer, a sequence of network devices linking a source network device to a destination network device of the network. Each asynchronous data link between the source network device and the destination network device is adapted to receive an incoming clock signal from the previous network device and then provide a clock signal synchronized to the received clock signal to the next network device of the sequence. At the same time, each network device of an asynchronous segment of the network can continue to transmit packets of data asynchronously. By locking the link-based frequency on a per link bases, the receiver clocks located at the edge of a network can be tied directly to a primary source located in the core network.

16 Claims, 5 Drawing Sheets

METHOD AND SYSTEM FOR LINK-BASED CLOCK SYNCHRONIZATION IN ASYNCHRONOUS NETWORKS

CROSS-REFERENCE TO RELATED APPLICATIONS

Priority is claimed based on U.S. Provisional Application No. 60/362,809 entitled "OE Sync/Clock Distribution" filed on Mar. 8, 2002.

FIELD OF THE INVENTION

The present invention relates generally to clock synchronization in networks and, more particularly, to a technique for clock synchronization in asynchronous and hybrid networks.

BACKGROUND OF THE INVENTION

Asynchronous networks, such as Ethernet networks, increasingly are being used to transmit real-time, synchronous, and/or time-sensitive data. To illustrate, wireless carriers often implement fiber-optic based Ethernet ("Optical Ethernet") networks to transmit voice data to/from a central office (CO) or point-of-presence (POP) to base transceiver stations. Likewise, various circuit emulation protocols for packet-based networks, such as Voice over Internet Protocol (VoIP), are commonly used to transmit real-time voice data over packet-switched networks.

These asynchronous networks often offer a number of advantages over synchronous networks, such as improved flexibility, increased bandwidth, widespread usage, less expense to implement, and the like. However, asynchronous networks often are at a disadvantage when used to transmit synchronous or real-time data. For one, unlike synchronous networks, asynchronous networks typically have jitter and wander that is unbound, making it difficult for the proper utilization of synchronous data at the receiving network device due to the indeterminate timing of the data. Additionally, most asynchronous networks do not have an inherent scheme to transmit clock synchronization information throughout the network, further compounding timing issues at receiving network devices.

FIG. 1 illustrates the difficulties of transmission of real-time/time-sensitive data over asynchronous networks in conventional systems. Depicted in FIG. 1 is a conventional VoIP system 100 having a synchronous network segment 160 and an asynchronous network portion 170. The synchronous network segment 160 includes a clock source 102 and a network device 106 connected via synchronous data link 172. The asynchronous network segment 170 includes network devices 108 and 110 connected to the network device 106 via asynchronous data links 174, 178, respectively. The illustrated conventional system 100 further includes a network device 112 connected to the network device 108 via asynchronous data link 176 and supporting a Voice Over Internet Protocol (VoIP) application 150.

The source 104 is adapted to provide real-time VoIP data to the VoIP application of the destination network device 112 via network devices 106, 108, whereby a user's voice at the source 104 is converted to digital data and packetized into packets 142, 144 along with the appropriate timestamps. The packets 142, 144 then are transmitted as part of a synchronous data stream over the synchronous network segment 160 to the intermediary network device 106. The network device 106 prepares the packets for transmission over the asynchronous network segment 170 and provides the packets 142, 144 as part of an asynchronous data stream to the intermediary network device 108, which then forwards the packets 142, 144 to the destination network device 112. At the appropriate time, as determined by the associated timestamp and the local clock of the network device 112, the VoIP application 150 extracts a data payload from the jitter buffer converts the data payload to an audio output for the user of the destination network device 112.

VoIP applications often are used to transmit voice conversations over packet-switched networks, such as the Internet. At the source of the voice conversation, the analog voice signal is sampled at a frequency of, for example, 8 kilohertz (kHz), resulting in a sample every 125 milliseconds (ms). After each sample is obtained, the source network device packetizes the sample along with a timestamp and transmits the packet over the packet-based network to the receiving network device as part of a stream of packets from the source network device. Ideally, the receiving network device then would extract a sample from the stream of packets and, using the associated timestamp, provide the appropriate sample for audio output every 125 ms. It will be appreciated, however, that actual asynchronous networks often experience considerable variation in both wander and jitter. Packets are often received out of order, dropped, and so on, resulting in an output sound quality that is less than optimal. Since such asynchronous networks typically do inherently implement a clock synchronization signal, the output sound quality is further degraded due to the variation in the operation of the clock at the source network device and the clock at the receiving network device. Such variation can cause the receiving network device to output the sample sooner and/or later than intended, resulting in clipped or garbled audio output.

Accordingly, it often is desirable to maintain synchronization between the clock ($CLK_{REF}$) of the source 104 and the local clock of the destination network device 112 to prevent overflow/underflow of the jitter buffer, improper timing in the playout of data by the VoIP application 150, and the like. It will be appreciated, however, that the packets 142, 144 have timestamps synchronized to the reference clock 102, whereas in the conventional system 100, the VoIP application 150 may be synchronized to the link 176. However, the link 176, being an asynchronous data link (e.g., Ethernet), typically does not provide for synchronization with the clock reference signal. To illustrate, link 174 between network device 106 may carry a clock signal $CLK_1$, the link 176 between the network device 108 and network device 112 may carry a clock signal $CLK_2$, and the link 178 between network devices 106 and 110 may carry a clock signal $CLK_3$, where each of clock signals $CLK_1$, $CLK_2$, and $CLK_3$ may vary significantly from $CLK_{REF}$. For example, in Ethernet, the variance often can be approximately 100 parts per million (ppm), resulting in a potential variance of 300 ppm for $CLK_3$. Accordingly, the VoIP application 150, when using $CLK_3$, as its reference may experience a number of errors when receiving and decoding the VoIP packets from the source 104, such as dropped packets, buffer overflow/underflow, and the like.

In response to the need for asynchronous networks to support clock distribution for legacy systems, such as private branch exchanges (PBX), wireless base stations, Internet servers, video terminals, T1 multiplexers, voice and video applications, and the like, a number of techniques have been developed to provide clock synchronization throughout an asynchronous network. One technique commonly implemented in packet-switched networks includes the synchronization of the transmitter clock and the receiver clock using timestamps. The transmitting network device sends a series of explicit time references as timestamps in a sequence of packets and the timestamps are used by the receiving network device to synchronize its clock to that of the transmitting network device. Since no common network clock is used, the receiving network device relies on locking its clock to the arrival of the timestamps using one or more complex clock synchronization algorithms. However, due to the transmission time dispersion prevalent in packet-based networks, these clock-recovery algorithms often are inaccurate, thereby affecting the processing of the synchronous data at the receiving network device. These timestamp-based synchronization techniques are exemplified by the Network Time Protocol (NTP) and IP Layer 3 Plus timestamping.

Another common method for clock synchronization support in asynchronous networks includes using Global Positioning System (GPS) to obtain a common clock signal. In such implementations, some or all of the network devices of the asynchronous network includes a GPS receiver adapted to receive radio signals from GPS satellites and to extract a timing reference from the signal. Each of the network devices utilizing the GPS signal in theory are then synchronized to the GPS timing reference. However, GPS-based clock synchronization techniques have a number of limitations. For one, the GPS-based clock synchronization systems often are cost-prohibitive due to the expense of the GPS receivers. Also, problems may arise when the network device is located within a building or otherwise does not have a line-of-sight with a GPS satellite, making it difficult if not impossible for the GPS receiver of the network device to receive a GPS signal from which the timing reference is to be extracted.

Alternatively, techniques have been developed to transmit synchronous data over an asynchronous network. One such technique is detailed in, for example, U.S. Pat. No. 6,246,702, entitled "Methods and apparatus for providing quality-of-service guarantees in computer networks," issued Jun. 12, 2001. This technique typically includes configuring the network adapters of a network device to control the timing of the transmission and reception of packets by distributing a clock reference embodied as a frame, where each network adapted is assigned a different portion of the frame in which it can transmit and/or receive. This technique requires specialized packet traffic engineering and, by doing so, increases the complexity of the management procedures. Additionally, by assigning each adapter to a specific portion of the frame, the benefits of asynchronous transmission/reception are lost.

In view of the foregoing, it would be desirable to provide a clock synchronization technique that overcomes the above-describe inadequacies and shortcomings. More particularly, it would be desirable to provide a technique for clock synchronization in an asynchronous network and/or hybrid network in an efficient and cost-effective manner.

SUMMARY OF THE INVENTION

In accordance with one embodiment of the present invention, a method is provided for synchronizing a second network device to a first network device, the first network device being connected to the second network device by a first asynchronous data link. The method comprises the steps of embedding, at the first network device, a first clock signal at a physical layer of the first asynchronous data link and extracting, at the second network device, the first clock signal from the physical layer of the first asynchronous data link. The method further comprises the step of synchronizing a local clock of the second network device based in part on the extracted first clock signal.

In accordance with another embodiment of the present invention, a system for synchronizing a plurality of network devices in a network is provided. The system comprises a first asynchronous data link, a first network device operably coupled to the first asynchronous data link and being adapted to embed a first clock signal at a physical layer of the first asynchronous data link, and a second network device operably coupled to the first asynchronous data link. The second network device is adapted to extract the first clock signal from the physical layer of the first asynchronous data link and synchronize a local clock of the second network device based on the extracted first clock signal.

In accordance with yet another embodiment of the present invention, a network device is provided. The network device comprises a first network interface operably connected to a first asynchronous data link and being adapted to extract a first clock signal embedded at a physical layer of the first asynchronous data link. The network device further comprises a phase-locked loop (PLL) operably connected to the first network interface and being adapted to synchronize an output clock signal to the extracted clock signal. The network device also comprises a second network interface operably connected to the PLL and to a second asynchronous data link and being adapted to embed a second clock signal at a physical layer of the second asynchronous data link, the second clock signal based in part on the output clock signal.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
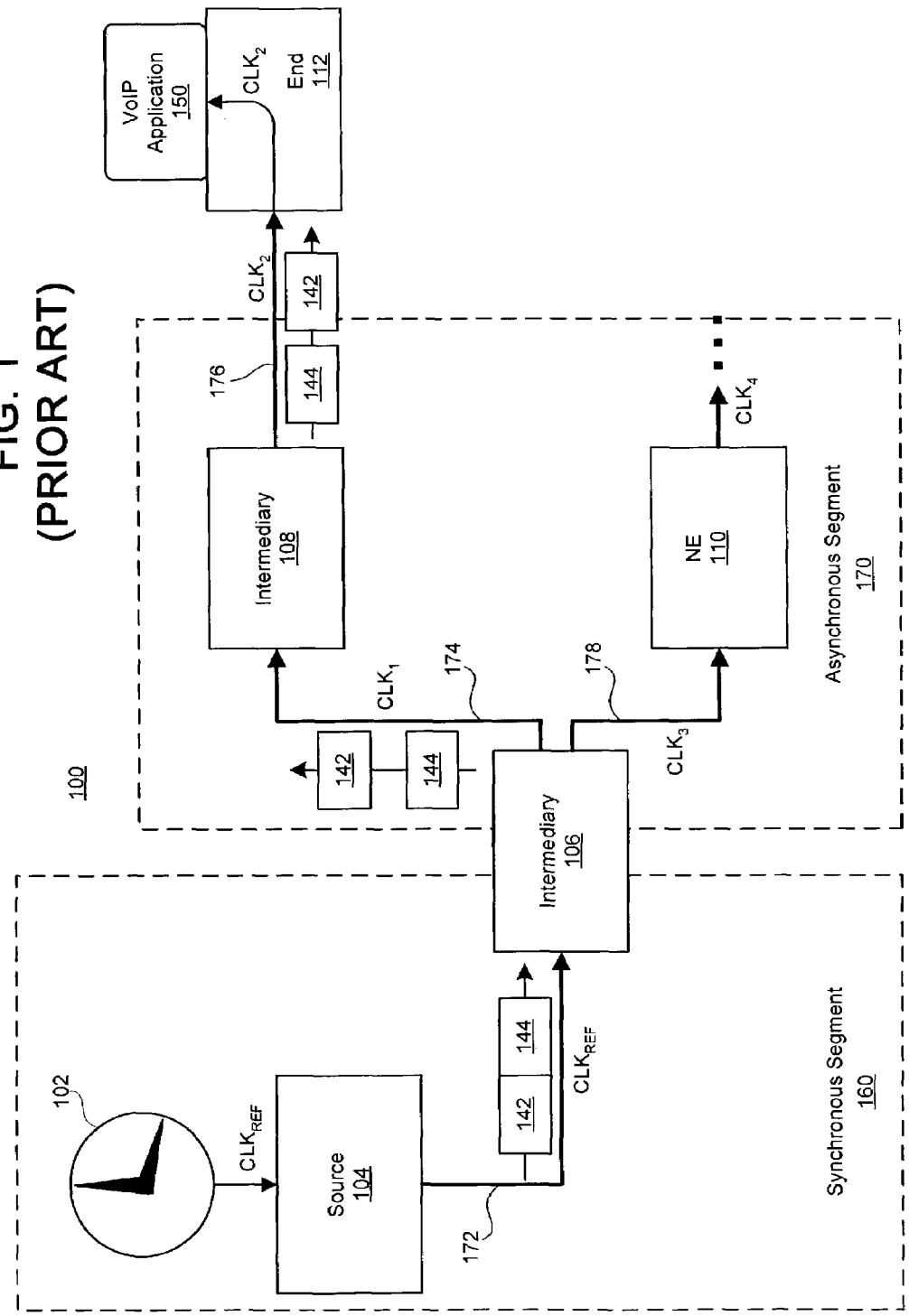
FIG. 1 is a schematic diagram illustrating a conventional system for distributing synchronous data in a hybrid network.

FIGS. 2-6 illustrate exemplary techniques and systems for clock synchronization in networks having one or more asynchronous data links. In at least one embodiment, a clock signal is propagated at the physical layer of asynchronous data link(s) between a source network device and a destination network device. Each device between the source network device and the destination network device, in one embodiment, is adapted to receive an incoming clock signal from a previous network device and then provide a signal synchronized to the incoming clock signal to the next network device. At the same time, each network device of the asynchronous segments of the network can continue to transmit packets of data asynchronously. By locking the link-based frequency on a per link-basis, the receiver clocks located at the edge of a network can be directly tied to a primary source located in the core network.

Clock synchronization techniques in accordance with at least one embodiment of the present invention can be used to synchronize the clocks of individual devices in a network to a common reference, as a clock synchronization mechanism for circuit emulation services (CES) over packet networks, and voice services (VoIP) over a packet network or synchronous storage applications over asynchronous packet networks. For example, to interwork circuit switched time-division multiplexing (TDM) networks through a packet switched network, the packet network generally is required to behave as a transparent "flow or tunnel" in the end-to-end path between the TDM networks. This transparent inclusion of a packet network in an end-to-end path of a connection that carries circuit-switched time-sensitive or TDM services often is referred to as "circuit emulation" on the packet network. CES allows a network operator to migrate network core infrastructure from circuit-switched TDM to packet-switched, while preserving the legacy circuit-switched TDM destination network devices. A reliable and efficient clock synchronization scheme provides for the successful deployment of CES. A lack of synchronization traceability between TDM network devices interconnected over the packet network may result in frame or byte slips that can affect data integrity for Voice, CES and Synchronous Storage applications.

The present invention can be implemented in any of a variety of systems that benefit from clock synchronization. For instance, at least one embodiment of the present invention could be implemented as part of a networking protocol used to transmit timing-sensitive data, such as multimedia, storage or voice, over an asynchronous or hybrid network. Various embodiments of the present invention can be implemented as hardware, software, or a combination thereof. For example, the exemplary clock synchronization methods described below could be implemented, in whole or part, as sets of instructions adapted to manipulate a processor or other processing device to perform the described process. Alternatively, the exemplary methods could be implemented, for example, as an application specific integrated circuit (ASIC), a microcontroller, programmable logic, and the like.

The term clock synchronization generally refers to frequency synchronization rather than time synchronization. Frequency synchronization may be understood to refer to the synchronization of the frequency of a local clock to the frequency of a reference clock, without requiring or expecting the local clock and reference clock to be equal in phase (i.e., equal in their time value with respect to an absolute time reference). Further, the term clock signal, as used herein, refers to a physical layer clock signal (i.e., a "bit-level" clock signal). For example, in an optical network, the clock signal could be transmitted as pulses of light encoded with the data stream transmitted over a fiber optic link.

Figure 2:
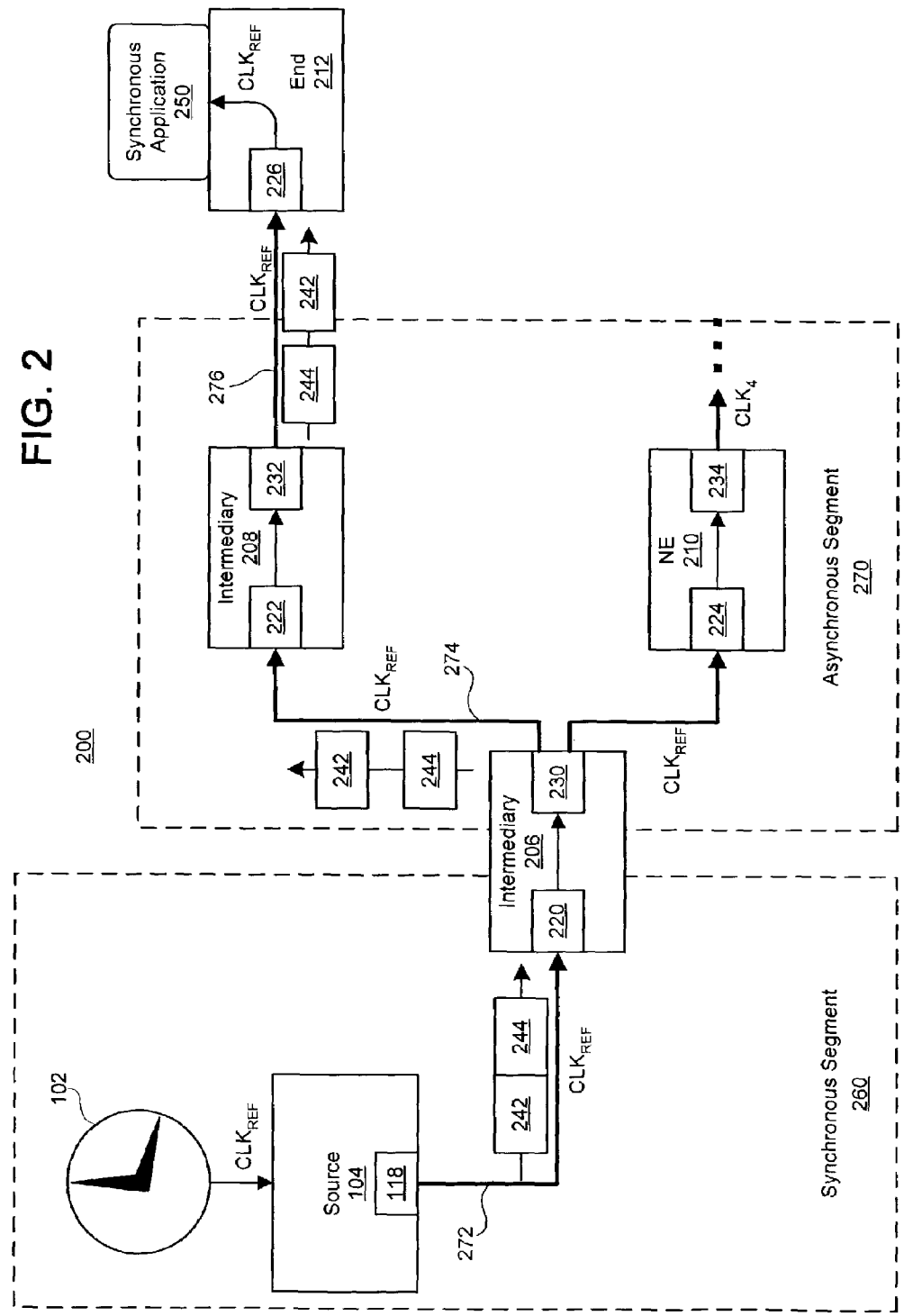
FIG. 2 is a schematic diagram illustrating an exemplary system for clock synchronization over an asynchronous data link in accordance with at least one embodiment of the present invention.

Referring now to FIG. 2, an exemplary network 200 implementing a clock distribution technique in accordance with at least one embodiment of the present invention is illustrated. For illustrative purposes, the network 200 includes a hybrid network having a synchronous network segment 260 connected, via network device 206, to an asynchronous network segment 270. Examples of synchronous networks include, but are not limited to, Time Division Multiplexing (TDM) networks (e.g., T1 or DS1, E1, digital networks), Synchronized Optical Networks (SONET), Synchronous Digital Hierarchy (SDH) networks. Examples of asynchronous networks include, but are not limited to, LANs, (Ethernet networks), SANs (Fiber Channel networks), IP networks (Internet), Optical Ethernet networks, Gigabit Ethernet networks, Frame Relay and the like. Although a particular network configuration is illustrated with reference to FIG. 2, the clock synchronization methods discussed herein can be implemented in any of a variety of networks, including an entirely asynchronous network (such as a local area network or LAN) or a hybrid network having one or more asynchronous data links interconnected with one or more synchronous data links (e.g., a metropolitan access network or MAN). The network devices of the network segments 260, 270 can be arranged in any of a variety of network topologies, including a hub-and-spoke network, a ring network, a mesh network, and the like.

The exemplary network 200 includes the clock source 102 and a plurality of network devices 104, 206-212. In the illustrated example, the source 104 is adapted to provide real-time or time sensitive data to a synchronous application module 250 of a destination network device 212 via a sequence of one or more intermediary network devices (e.g., network device 206, 208). The source 104 may include, for example, an application residing within the synchronous network segment 260 that communicates with synchronous application 250 or may include an integral part of the synchronous network segment 260, such as a centralized clocking source. In either case, a clock signal is delivered to the synchronous application 250 residing at the network edge.

The terms "source," "intermediary," "destination," and "sequence" are used herein to describe the network devices 104, 206-212 in relation to the clock source 102, where the source network device is effectively directly connected to the clock source, the destination network device is located at the edge of the network segment 260, and the source network device and the destination network device are linked via a sequence of one or more intermediary network devices. The "initial" intermediary network device of the sequence is the intermediary network device immediately downstream from the source 104 (e.g., network device 206), whereas the "final" intermediary network device of the sequence is the intermediary network device immediately upstream from the destination network device 212 (e.g., network device 208). In networks having only one intermediary network device between the source network device and the destination network device, the sole intermediary network device is both the initial intermediary network device and the final intermediary network device.

The network devices 104, 206-212 can include any of a variety of network devices implemented in communications networks, such as bridges, routers, switches, repeaters, hubs, access concentrators, storage switches, optical network terminations (ONTs), optical line terminations (OLTs), multiplexers (e.g., T1 multiplexers or add/drop multiplexers), modems (e.g., dial-up, cable or digital subscriber line modems), as well as desktop computers, notebook computers, digital personal assistants, wireless telephones, and the like.

In at least one embodiment, the network 200 is implemented to transmit synchronous data/real-time data from the source 104 to the destination network device 212 for use by the synchronous application module 250 of the destination network device 212. To illustrate, the network 200 could include a Voice Over Internet Protocol (VoIP) system whereby a user's voice at the source 104 is converted to digital data and packetized into packets 242, 244 along with the appropriate timestamps. The packets 242, 244 then are transmitted as part of a synchronous data stream over the synchronous network segment 260 to the intermediary network device 206. The network device 206 prepares the packets, as necessary, for transmission over the asynchronous network segment 270 and provides the packets 242, 244 as part of an asynchronous data stream (e.g., a stream of data packets) to the intermediary network device 208 via asynchronous data link 274, the network device 208 then forwards the packets 242, 244 to the destination network device 212 via asynchronous data link 276. The network device 212 then stores the data payloads/timestamps of the packets 242, 244 in, for example, a jitter buffer.

At the appropriate time, as determined by the associated timestamp and the local clock of the network device 212, the application module 250 (e.g., an Internet telephone software program) extracts a data payload from the jitter buffer converts the data payload to an audio output for the user of the destination network device 212. In such an implementation, it often is desirable to maintain synchronization between the clock of the source 104 and the local clock of the destination network device 212 to prevent overflow/underflow of the jitter buffer, improper timing in the playout of data by the application module 250, and the like. However, since asynchronous networks typically do not implement a clock distribution technique at the physical layer, other techniques conventionally are used for clock synchronization, such as the transmission of clock timestamps and/or synchronization to a GPS signal. However, as noted above, these conventional techniques are limited due to the jitter/wander inherent to packet-based networks and/or the cost and complexity of implementing these techniques.

Accordingly, in at least one embodiment, a reference clock signal ($CLK_{REF}$) generated from the reference clock 102 is distributed among the network devices 104, 206-212 in a link-by-link basis. Upon receipt of the reference clock signal $CLK_{REF}$ at its upstream network interface, each intermediary network device locks its clock to the reference clock signal $CLK_{REF}$ and then propagates the reference clock signal $CLK_{REF}$ at the physical layer to the next network device in the sequence via the downstream network interface of the intermediary network device.

The reference clock signal $CLK_{REF}$ can be obtained by the source 104 in any of a variety of ways. For example, the reference clock signal $CLK_{REF}$ could be obtained from a local oscillator of the source 104. Additionally, the source 104 could include, for example, a GPS receiver adapted to extract the reference clock signal $CLK_{REF}$ from a signal received from a GPS satellite. It will be appreciated that network clock sources are often divided by level, or "stratum," of accuracy, with stratum-1 clocks being the most accurate, stratum-2 clocks being less accurate than stratum-1 clocks but more accurate than stratum-3 clocks, and so on. To illustrate, stratum-1 clock sources typically have a frequency offset of $1 \times 10^{-11}$ or less and typically are derived from a cesium clock. The reference clock 102 preferably includes a stratum-1 clock source implemented as part of the source 104 or directly connected to the source 104 via, for example, a radio signal transmission.

The link-by-link clock distribution method described above is demonstrated by the following example. Using the reference clock signal $CLK_{REF}$ from the reference clock 102, the source 104 locks its local clock to the reference clock signal $CLK_{REF}$ and transmits the reference clock signal $CLK_{REF}$ to the intermediary network device 206 using the downstream network interface 118 (e.g., an SDH network interface). The intermediary network device 206 receives the reference clock signal $CLK_{REF}$ via its upstream network interface 220, locks its local clock to the reference clock signal $CLK_{REF}$, and transmits the reference clock signal $CLK_{REF}$ to the intermediary network devices 208, 210, via its downstream network interface 230 (e.g., an Optical Ethernet interface). As with the intermediary network device 206, the network devices 208, 210 use the reference clock signal $CLK_{REF}$ received via the upstream network interfaces 222, 224, respectively, to synchronize their local clocks and output the reference clock signal $CLK_{REF}$ via downstream interfaces 232, 234, respectively. The reference clock signal $CLK_{REF}$ is received by the downstream interface 226 of the destination network device 212 from the intermediary network interface 208. The destination network device 212 synchronizes its local clock with the reference clock signal $CLK_{REF}$. Likewise, the reference clock signal $CLK_{REF}$ output by the downstream network interface of the intermediary network device 210 can be used to synchronize another intermediary network device, destination network device, and so on.

After the link-by-link synchronization process is performed, the local clock of the destination network device 212 is substantially synchronized to the source 104. Consequently, the synchronized data/real-time data transmitted by the source 104 intended for the destination network device 212 can be more accurately processed by the application module 250 using a local clock of the destination network device 212 synchronized to the local clock of the source 104 using the propagated reference clock signal $CLK_{REF}$.

In the event that the network segment between two network devices is a synchronous network, such as a SONET or SDH network segment, the downstream network interface can be adapted to utilize a physical-level clock signaling technique suitable to the synchronous network. To illustrate, the originating network device (NE) can be adapted to use line timing (as in SONET/SDH and digital voice switches) while the terminating (end) network device can be adapted to use loop timing (as in SONET/SDH and digital voice switches).

Conversely, most asynchronous data links do not have a "standard" physical-level clock signaling technique. The clock signal output by the downstream network interface of a network device can be transmitted over an asynchronous data link in a variety of ways. For example, for wire-based transmission mediums, the clock synchronization signal could be transmitted using a separate wire reserved for clock synchronization purposes. It will be appreciated that this approach may increase the cost and/or complexity of the resulting implementation, as well as deviate from well-established physical connection standards, such as those developed for coaxial cable, RJ-45, and the like. Accordingly, the clock synchronization signal preferably is a bit-level synchronization signal that is embedded into the physical layer of the asynchronous data link along with the transmitted asynchronous data stream using the appropriate encoding scheme. By embedding the clock signal into the asynchronous data stream, a reference clock signal may be transmitted without requiring synchronous transmission of data in an asynchronous data link. Examples of coding techniques useful in embedding the reference clock signal in a data stream include, but are not limited to, Alternate Mark Inversion (AMI), Binary 8 Zero Substitution (B8ZS), High Density Bipolar 3 (HDB3), Basic 8B/10B codes (Ethernet and Fiber Channel) or biphase encoding used in wire-based transmission medium, and Pulse Width Modulation (PWM) used in fiber-optics based transmission mediums. Other encoding schemes and/or bit level synchronization techniques may be implemented without departing from the spirit or the scope of the present invention.

In addition to embedding the reference clock signal $CLK_{REF}$ at the physical layer, some or all of the network devices 104, 206-212 can be adapted to transmit an indication of the stratum level of the reference clock signal being propagated. One technique for transmitting this indicator is to include a reference to the stratum level in one or more messages transmitted between the network devices at a layer above the physical layer. To illustrate, those network devices having a downstream interface to a SONET link, for example, can use SONET/SDH synchronization messages to transmit the stratum level of the embedded reference clock signal to the upstream SONET interface of the next device in the sequence. Similarly, those network devices having a downsteam interface to an Ethernet link, for example, can use Ethernet link management messages (IEEE 802.11 ah) to transmit an indication of the stratum level of the reference clock to the upstream interface of the next device in the sequence. The end network device 212 can use this propagated stratum level indicator in various ways, such as to select the more accurate of two or more clock reference signals received (e.g., one from link 276 and one from a GPS receiver) and the like.

Figure 3:
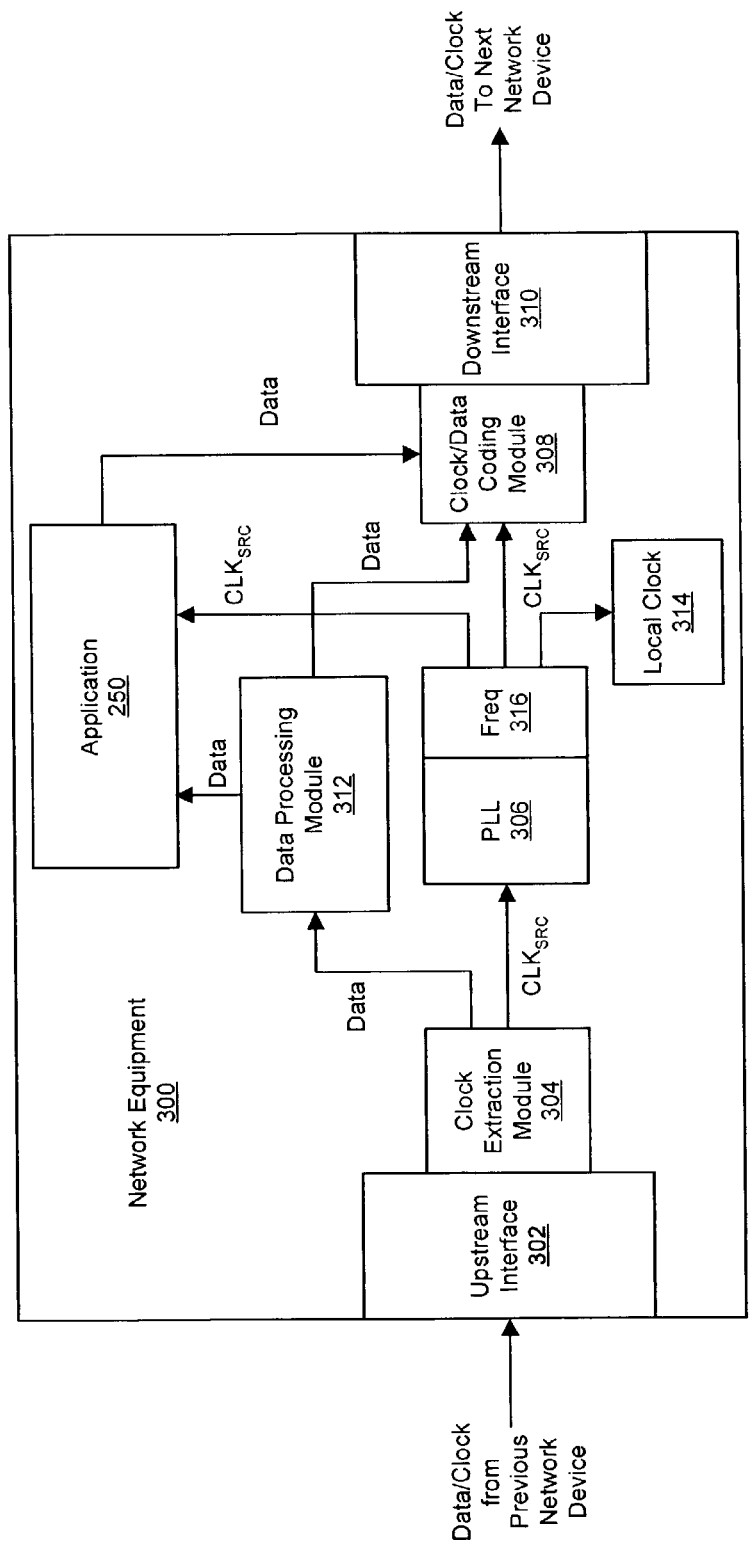
FIG. 3 is a schematic diagram illustrating an exemplary network device being adapted to transmit a synchronized clock signal in accordance with at least one embodiment of the present invention.

Referring now to FIG. 3, an exemplary network device 300 adapted to provide link-by-link clock synchronization is illustrated in accordance with at least one embodiment of the present invention. The illustrated network device 300 includes an upstream network interface 302, a clock extraction module 304, one or a series of phase-locked loops (PLL 306), a clock/data coding module 308, a downstream network interface 310, and a local clock 314. The network device 300 further can include a data processing module 312, a frequency adapter 316, and/or an application module 250.

As discussed above, each link between a source network device and a destination network device is adapted to propagate, link-by-link, a reference clock signal and any asynchronous data intended for the destination network device. Also noted above, the reference clock signal preferably is embedded in the data stream using any of a variety of bit-level clock reference encoding schemes, such as biphase coding. The data/clock signal is received at the upstream network interface 302 of the network device 300. The upstream network interface 302 can include any of a variety of network interfaces appropriate for the network and the network medium to which it is connected. For example, the network segment upstream of the network device 300 could include a synchronous network, such as a SONET, SDH, DS0, DS1 and E1 digital networks, X.25, or ATM network, connected via a copper-based, fiber optic, or wireless network medium. Alternatively, the network upstream of the network device 300 could include an asynchronous network, such as LAN and/or SAN, Frame Relay, IP network (Internet), Ethernet and the like.

The upstream network interface 302 forwards the data/clock signal to the clock extraction module 304. The clock extraction module 304, in one embodiment, is adapted to decode the data/clock signal to obtain separate reference clock and data signals. The extracted reference clock signal $CLK_{SRC}$ is provided to the PLL 306 and the data stream can be provided to the data processing module 312. Alternatively, if the reference clock signal is not embedded in the incoming data stream, the reference clock signal can be provided directly from the upstream network interface 302 to the PLL 306.

In at least one embodiment, the PLL 306 is adapted to synchronize the local clock 314 of the network device 300 using the reference clock signal $CLK_{SRC}$ extracted by the clock extraction module 304. The PLL 306 preferably includes a fractional PLL, but may also include an integer PLL. Alternatively, rather than using a single PLL 306, the network device 300 can include a series of two or more PLLs to synchronize various local clocks (if multiple clocks are required for data processing or synchronize the local clock 314 to input reference clock signal $CLK_{SRC}$.

It will be appreciated that there may be a difference between transmission rates at the upstream and downstream interfaces of the network device 300. For example, the upstream network could have a 100Base-Fx transmission rate whereas the downstream network could have a DS1, E1 synchronous data link (1 GbE back to synchronous storage link IBM Geoplex) or SONET Optical Carrier-48 (OC-48) transmission rate. Accordingly, in one embodiment, the network device 300 further includes one or more frequency adapters 316 to adjust for any transmission rate mismatch between the upstream and downstream network segments.

The synchronized clock signal output by the PLL 306/frequency adapter 316 may be provided to a number of components of the network device 300. For example, the synchronized output clock signal could be used to synchronize the local clock 314. The local clock 314 then could be used by one or more applications 250 to process data. Alternatively, the synchronized clock could be provided directly to the application module 250 for use in processing data. The synchronized clock signal (synchronized to the reference clock signal $CLK_{REF}$) is also provided to the clock/data coding module 308.

The data output by the clock extraction module 304, in one embodiment, is provided to the data processing module 312. The data processing module 312 preferably implements one or more layers of one or more network protocol stacks and is adapted to prepare the data for transmission via the downstream network interface 310 and/or use by the application module 250, such as by buffering the data, encapsulating/reencapsulating the data, performing error checks, modifying packet/frame headers, and the like. To illustrate, the network device 300 could include a networked notebook computer operating a VoIP Internet phone software application (one example of the application module 250). Accordingly, as VoIP packets (voice data) are received from the source network device on the other end of the network, the data processing module 312 could be adapted to decapsulate the VoIP packets using an IP network protocol stack to obtain the data payloads of the packet. The data payloads then may be provided to the Internet phone software application, which uses the output signal from the PLL 306/frequency adapter 316 to determine the appropriate times to provide the data payloads for audible output via a speaker of the notebook computer.

Data from the data processing module 312 and/or the application module 250 intended for the next network device in the sequence is provided to the clock/data coding module 308. The clock/data coding module 308 then embeds the reference clock signal output by the PLL 306 with the supplied data signal(s) using an encoding scheme appropriate to the downstream network transmission medium, such as B8ZS for wire-based mediums and PWM for fiber-optic mediums. The outgoing data/clock signal is then transmitted to the next network device in the sequence of network devices via the downstream network interface 310. The downstream interface 310 can be further adapted to transmit an indicator of the stratum level of the clock reference signal $CLK_{SRC}$ as, for example, a SONET synchronization message (in a SONET interface), a Ethernet link management message (in an Ethernet interface) and the like. In this case, the upstream interface 302 can, for example, extract the indicator of the stratum level from a message received from the previous network device and forward this indicator to the downstream interface 310 for transmission as a message to the next network device.

By using the PLL 306, the clock signal used by the downstream network interface 310 can be synchronized to the reference clock signal provided by the previous network device in the sequence of network devices between the source and the destination network devices. As each link is synchronized to the previous link, the reference clock signal provided by the source network device can be propagated to the destination network device, thereby providing a synchronized timing reference for use by one or more real-time or time-sensitive applications at the destination network device. However, as the synchronized reference clock signal preferably is provided to the next network device at the bit level and not at the packet level, the network device 300 is not restricted to only synchronously transmitting/receiving downstream data may transmit/receive data asynchronously as appropriate.

Figure 4:
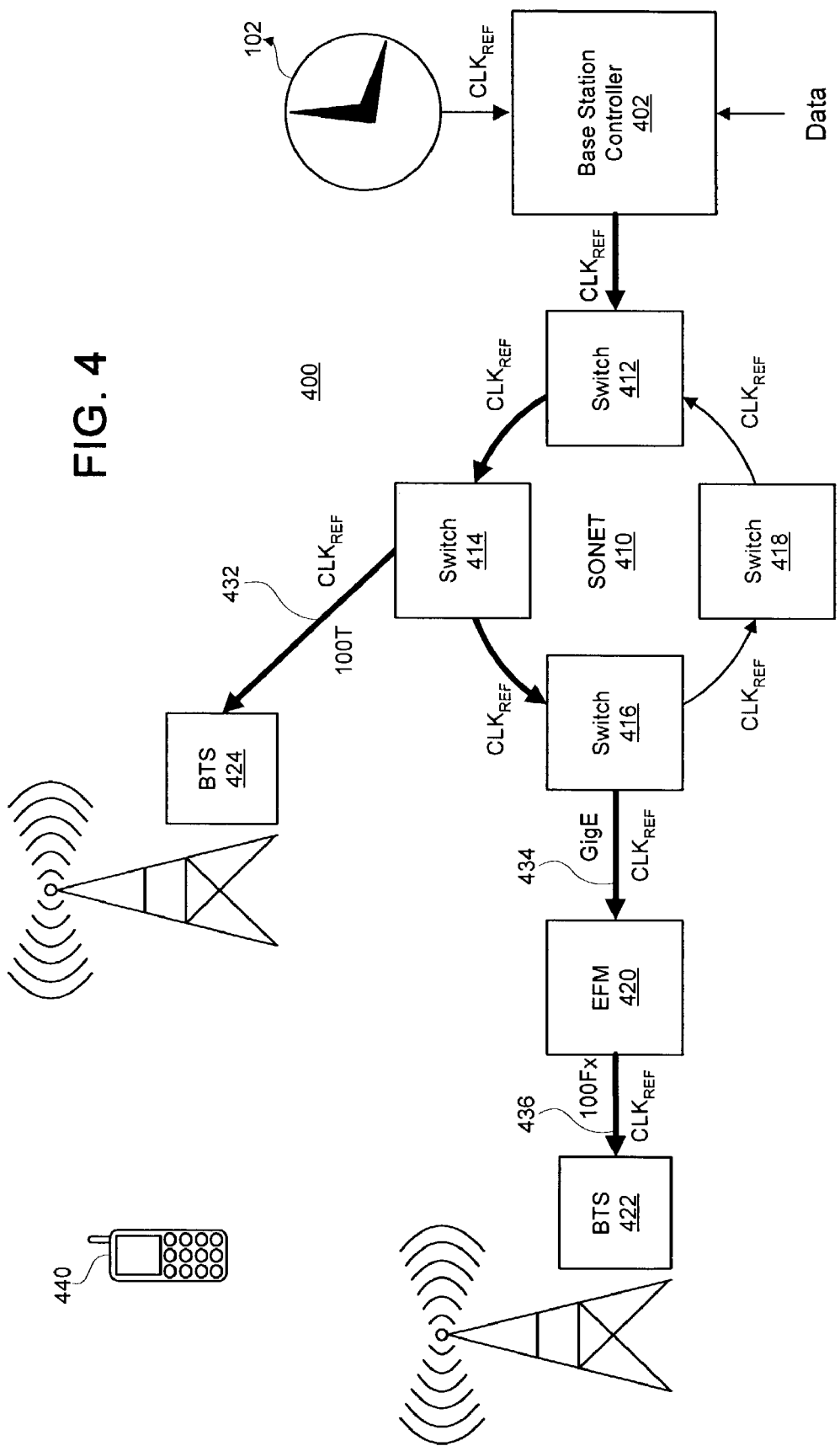
FIG. 4 is a schematic diagram illustrating an exemplary wireless system implementing a clock synchronization technique in accordance with at least one embodiment of the present invention.

Referring now to FIG. 4, an exemplary implementation of a link-by-link clock synchronization technique in a wireless phone backhaul system is illustrated in accordance with at least one embodiment of the present invention. The illustrated backhaul system 400 includes a base station controller (BSC) 402, at least two base transceiver stations (BTS) 422, 424, a SONET network segment 410, a 100Base-T copper wire Ethernet network, a Gigabit Ethernet fiber-optic network segment 434, and a 100Base-Fx copper wire Ethernet network segment 436. The BSC 402 is connected to the BTS 422 via the SONET network segment 410, the Gigabit Ethernet network segment 434, Ethernet First Mile (EFM) fan-in equipment 420, and the 100Base-Fx Ethernet network segment 436. The BSC 402 is connected to the BTS 424 via the SONET network segment 410 and the 100Base-T Ethernet network segment 432.

It will be appreciated by those skilled in the art that accurate clock synchronization often is critical to the proper operation of the backhaul system 400, where the local clocks of the BTSs 422, 424 often must be synchronized to the local clock of the BSC 402 to within 0.05 parts per million (ppm). A demonstration of the importance of clock synchronization in wireless systems follows. During operation, a wireless phone 440 preferably is in contact with at least two BTSs to adjust for any movement by the wireless phone 440 between various cells. The BSC 402 provides each designated BTS with voice data packets for transmission to the wireless phone 440. The wireless phone 440 is directed to receive voice data packets from the primary BTS and to ignore the packets from the secondary BTS. However, should the wireless phone 440 move closer to the secondary BTS than to the primary BTS, the BSC 402 notes the changes in signal strength between the BTSs 422, 424 (or uses some other indicator) and directs the secondary BTS to become the primary BTS for the wireless phone 440. Accordingly, the wireless phone 440 switches to the frequency output by the previously secondary, now-primary BTS.

To provide a smooth transition between BTSs as the wireless phone 440 moves from cell to cell, the BTSs typically are adapted to transmit the voice data packets synchronously. In order to do so accurately, each BTS needs a clock reference that is synchronized to the other BTS as well as the BSC 402. One common method to provide this synchronized clock reference is to implement an entirely synchronous network between the BSC 402 and the BTSs 422, 424. However, such entirely synchronous networks are loosing favor to hybrid networks due to the cost savings, widespread use, and flexibility provided by asynchronous networks. Consequently, entirely asynchronous networks or hybrid networks are increasingly used. To provide clock distribution, various techniques for providing a synchronized clock signal have been developed, including the transmission of timestamps across the network to the BTSs and/or the implementation of GPS receivers to obtain a clock reference from the signals provided by GPS satellites. However, as noted previously, these implementations have a number of limitations.

Accordingly, in at least one embodiment, the backhaul system 400 implements the link-by-link clock synchronization method described above. The BSC 402 receives a reference clock signal $CLK_{REF}$ from a reference clock 102 (e.g., a stratum-1 clock) and uses this signal in the synchronous transmission of data from the BSC 402 through the SONET network segment 410. Since the SONET network segment 410 is a synchronous network, each of switches 412-418 is synchronized to the BSC 402. To synchronize the BTS 424 to the reference clock signal $CLK_{REF}$, the switch 414 can be adapted to embed a clock signal synchronized to the BSC 402 into the asynchronous data stream transmitted between the switch 414 and the BTS 424 over the 100Base-T Ethernet network segment 432. The BTS 424 then can use a PLL or other means to synchronize its local clock to the reference clock signal $CLK_{REF}$.

Likewise, to synchronize the BTS 422 to both the BTS 424 and the BSC 402, the switch 416 can be adapted to synchronize its interface to the reference clock signal $CLK_{REF}$ provided by the switch 414. The synchronized clock signal then can be provided to the EFM equipment 420 during the asynchronous transmission of data packets between the switch 416 and the EFM equipment 420 over the Gigabit Ethernet network segment 434. Using one or more PLLs (e.g., PLL 306, FIG. 3), the EFM equipment 420 can synchronize its downstream interface to the BTS 422 with its upstream interface to the switch 416. The synchronized clock signal output by the EFM equipment 420 is embedded in the asynchronous data stream between the EFM equipment 420 and the BTS 422. The BTS 422 then may synchronize its local clock to the input synchronized clock signal using one or more PLLs.

By embedding a synchronized clock signal in the data signal transmitted between each link in the asynchronous portion of the system 400, the BTSs 422, 424 and the BSC 402 can be synchronized to the same reference clock signal without limiting the flexibility and/or bandwidth provided by transmitting data asynchronously though portions of the system 400.

Figure 5:
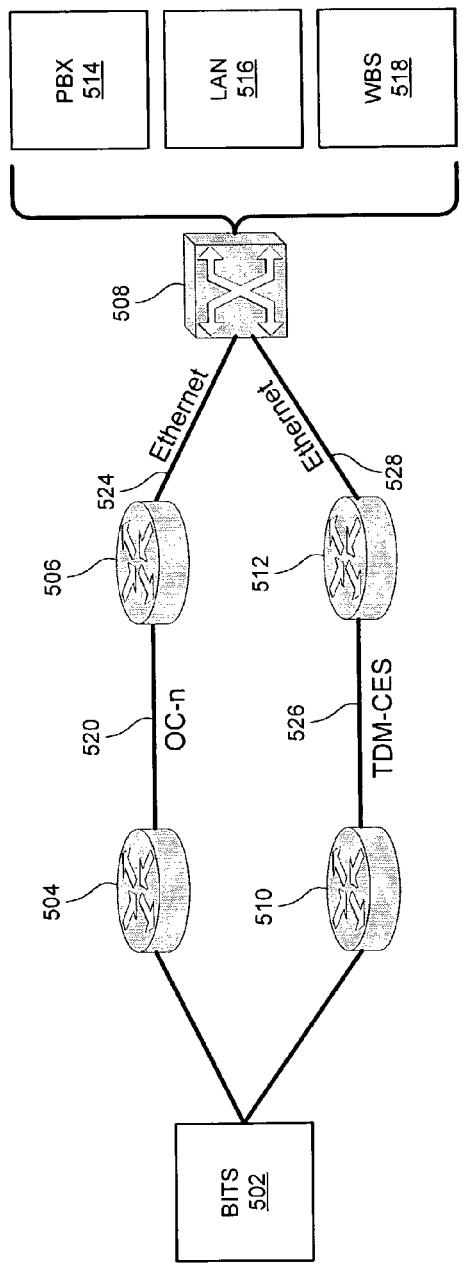
FIGS. 5 and 6 are schematic diagrams illustrating exemplary systems utilizing the clock synchronization techniques of FIGS. 2 and 3 in accordance with at least one embodiment of the present invention.
Figure 6:
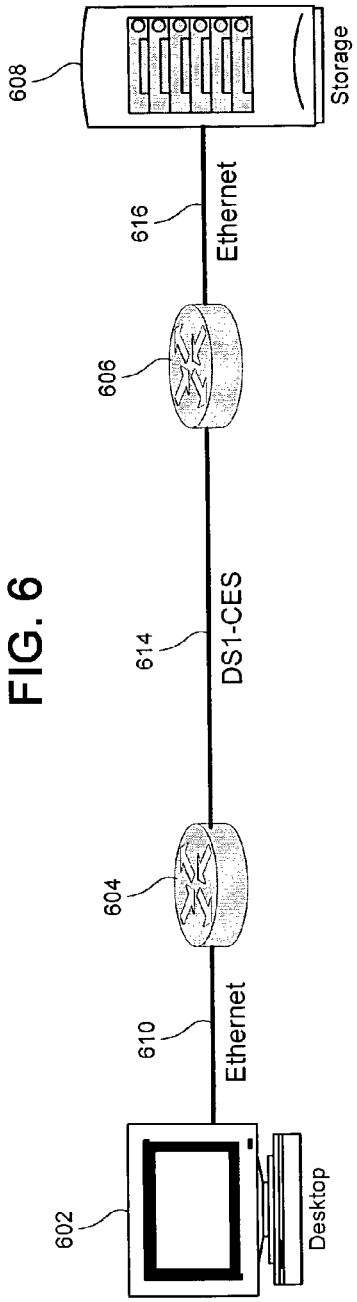

Referring now to FIGS. 5 and 6, additional exemplary implementations of the clock synchronization techniques discussed herein are illustrated in accordance with at least one embodiment of the present invention. FIG. 5 illustrates two exemplary network segment sequences for synchronizing a private branch exchange (PBX) 514, a LAN 516, and/or a wireless broadcasting station (WBS) 518 with a building-integrated timing supply (BITS) 502. In the first example, a reference clock signal (not shown) from the BITS 502 can be provided to the network device 504, which is connected to a network device 506 via an OC-n synchronous data link 520. The network device 504 can be adapted to transmit the reference clock signal to the network device 506 over the OC-n link 520 a clock signal propagation technique conventionally used in OC-n networks. The network device 506, in turn, is connected to a network device 508 via an Ethernet link 524.

Accordingly, the network device 506 can be adapted to embed the reference clock signal received from network device 504 at the physical layer of the link 524 and transmit the reference clock signal at the physical layer while continuing to transfer data asynchronously between the network device 506 and the network device 508. The network device 508 then can provide the data and the reference clock signal to one or more of the PBX 514, LAN 516, and WBS 518 as appropriate.

In a similar manner, the BITS 502 can provide the reference clock signal to a network device 510 connected to a network device 512 via a TDM-CES link 526. The network device 512, in turn, is connected to the network device 508 via an Ethernet link 528. In this case, the network device 510 can be adapted to transmit the clock reference signal to the network device 512 using a technique common to TDM-CES networks. The network device 512 then may be adapted to embed the reference clock signal received over the TDM-CES link 526 at the physical layer of the Ethernet link 528 while transmitting data over the Ethernet link 528 to the network device 508 asynchronously. The network device 508 then can transmit the reference clock signal and the data to any of the PBX 514, the LAN 516, and/or the WBS 518 as appropriate.

FIG. 6 illustrates an exemplary implementation of the clock synchronization techniques described above in a network having a desktop computer 602 connected to a synchronous storage device 608 via network devices 604, 606. The network segment 610 between the computer 602 and the network device 604, in this example, includes an Ethernet segment, as does the network segment 616 between the network device 606 and the synchronous storage system 608. The network segment 614 between the network device 604 and network device 606, in this example, comprises a DS1-CES optical network segment. The network devices 604, 608, in this example, can be adapted to receive a reference clock signal (not shown) received from the optical network segment 614 and embed this clock reference signal at the physical layer of the corresponding Ethernet segment 610, 616, respectively. Using the embedded reference clock signals, the computer 602 and storage device 608 can synchronize the storage of data to, and output of data from, the storage device 608.

At this point it should be noted that techniques for link-by-link clock synchronization in accordance with the present invention as described above typically involve the processing of input data and the generation of output data to some extent. This input data processing and output data generation may be implemented in hardware or software. For example, specific electronic components may be employed in a processor, integrated circuit, or similar or related circuitry for implementing the functions associated with clock synchronization in accordance with the present invention as described above. Alternatively, one or more processors operating in accordance with stored instructions may implement the functions associated with the exemplary clock synchronization techniques in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for synchronizing a second network device to a first network device, the first network device being coupled to an intermediary network device via a first data link, and the intermediary network device being coupled to the second network device via a second data link, at least one of the first data link and the second data link being an asynchronous data link, the method comprising the steps of:
   embedding, at the first network device, a first clock signal at a physical layer of the first data link;
   extracting, at the intermediary network device, the first clock signal from the physical layer of the first data link;
   synchronizing, at the intermediary network device, a first local clock based at least in part on the extracted first clock signal;
   embedding, at the intermediary network device, a second clock signal at a physical layer of the second data link, the second clock signal representative of the first local clock;
   adjusting the second clock signal to a transmission rate of the second data link;
   extracting, at the second network device, the second clock signal from the physical layer of the second data link; and
   synchronizing, at the second network device, a second local clock based at least in part on the extracted second clock signal.

2. The method as in claim 1, wherein the second data link is a synchronous data link and wherein the method further comprises the step of:
   synchronizing a clock signal of the synchronous data link based at least in part on the second local clock.

3. The method as in claim 2, wherein the synchronous data link includes one of a group consisting of: a Synchronous Optical Network (SONET) segment, a Synchronous Digital Hierarchy (SDH) segment, a DS0 network segment, a DS1 network segment, an E1 digital network segment, and a synchronous storage network segment.

4. The method as in claim 1, wherein the asynchronous data link includes one of a group consisting of: an Ethernet network segment, a Fiber Channel network segment, an IP network segment, an Optical Ethernet network segment, a Gigabit Ethernet network segment, and a Frame Relay network segment.

5. The method as in claim 1, further comprising the step of:
   propagating an indicator of a stratum level of the first clock signal from the first network device to the second network device via the first asynchronous data link.

6. The method as in claim 1, further comprising the step of:
   synchronizing a local clock of the first network device to a reference clock;
   wherein the first clock signal is based on the synchronized local clock of the first network device.

7. The method as in claim 1, further comprising the step of:
   providing the second local clock to a synchronous application at the second network device.

8. At least one processor readable medium for storing a computer program of instructions configured to be readable by at least one processor for instructing the at least one processor to execute a computer process for performing the method recited as in claim 1.

9. A system for synchronizing a plurality of network devices in a network, the system comprising:
- a first data link coupling a first network device to an intermediary network device;
- a second data link coupling the intermediary network device to a second network device;
- at least one of the first data link and the second data link being an asynchronous data link;
- the first network device being configured to embed a first clock signal at a physical layer of the first data link;
- the intermediary network device being configured to:
  - extract the first clock signal from the physical layer of the first data link;
  - synchronize a first local clock based at least in part on the extracted first clock signal;
  - embed a second clock signal at a physical layer of the second data link, the second clock signal representative of the first local clock; and
  - adjust the second clock signal to a transmission rate of the second data link; and
- the second network device being configured to:
  - extract the second clock signal from the physical layer of the second data link;
  - synchronize a second local clock based at least in part on the extracted second clock signal.

10. The system as in claim 9, wherein:
- the second data link is a synchronous data link; and
- the second network device is further configured to synchronize a clock signal of the synchronous data link based at least in part on the second local clock.

11. The system as in claim 10, wherein the synchronous data link includes one of a group consisting of: a Synchronous Optical Network (SONET) segment, a Synchronous Digital Hierarchy (SDH) network segment, a DS0 network segment, a DS1 network segment, an E1 digital network segment, and a synchronous storage network segment.

12. The system as in claim 9, wherein the asynchronous data link includes one of a group consisting of: an Ethernet network segment, a Fiber Channel network segment, an IP network segment, an Optical Ethernet network segment, a Gigabit Ethernet network segment, and a Frame Relay network segment.

13. The system as in claim 9, further comprising:
- means for transmitting an indicator of a stratum level of the first clock signal from the first network device to the second network device via the first asynchronous data link.

14. A network device comprising:
- a first network interface operably connected to a first asynchronous data link and being configured to extract a first clock signal embedded at a physical layer of the first asynchronous data link;
- a phase-locked loop (PLL) operably connected to the first network interface and being configured to synchronize an output clock signal to the extracted clock signal;
- a second network interface operably connected to the PLL and to a second asynchronous data link and being configured to embed a second clock signal at a physical layer of the second asynchronous data link, the second clock signal based in part on the output clock signal; and
- means for adjusting the second clock signal to a transmission rate of the second asynchronous data link.

15. The network device as in claim 14, further comprising means for transmitting an indicator of a stratum level of the second clock signal via the second asynchronous data link.

16. A method for synchronizing a plurality of network devices in a network, the method comprising:
- coupling an intermediary network device to a first data link;
- extracting, at the intermediary network device a first clock signal embedded at a physical layer of the first data link;
- synchronizing an output clock signal to the extracted first clock signal;
- coupling the intermediary network device to a second data link;
- embedding a second clock signal at a physical layer of the second data link, the second clock signal based at least in part on the output clock signal; and
- adjusting the second clock signal to a transmission rate of the second data link.

* * * * *